United States Patent [19]
Gregg

[11] 3,826,561
[45] July 30, 1974

[54] LASER PULSE TAILORING METHOD AND MEANS

[75] Inventor: David W. Gregg, Lafayette, Calif.

[73] Assignee: The United States of America as represented by the United States Atomic Energy Commission, Washington, D.C.

[22] Filed: May 3, 1973

[21] Appl. No.: 356,864

[52] U.S. Cl.............. 350/204, 350/294, 331/94.5 A, 356/74, 176/1
[51] Int. Cl...................... G02b 27/40, G02b 3/00
[58] Field of Search.......... 331/94.5; 350/160, 204, 350/294; 356/74; 176/1

[56] References Cited
UNITED STATES PATENTS

| | | | |
|---|---|---|---|
| 3,283,262 | 11/1966 | Marcatili | 331/94.5 |
| 3,459,466 | 8/1969 | Giordmaine | 350/160 |
| 3,577,094 | 5/1971 | Tomlinson et al. | 331/94.5 |
| 3,681,709 | 8/1972 | Brown | 331/94.5 |

Primary Examiner—Ronald L. Wibert
Assistant Examiner—R. J. Webster
Attorney, Agent, or Firm—John A. Horan; F. A. Robertson; L. E. Carnahan

[57] ABSTRACT

A method and means for time-tailoring the intensity of focussed laser radiation in the focal region by permitting stepwise shaping in space and time or by providing a continuous pulse shape which are basically accomplished by dividing up and reassembling portions of the laser beam. Stepwise shaping is accomplished by reflector assemblies which divide the pulse and redirect the portions thereof to allow arrival at a selected time and direction. Continuous pulse shaping is accomplished by the combination of a blazed diffraction grating reflector and a paraboloidal reflector, whereby a selected profile can be established to satisfy time intensity of the laser.

2 Claims, 6 Drawing Figures

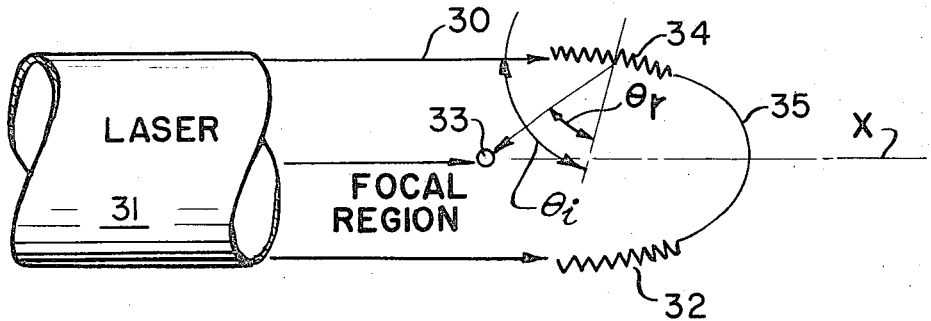
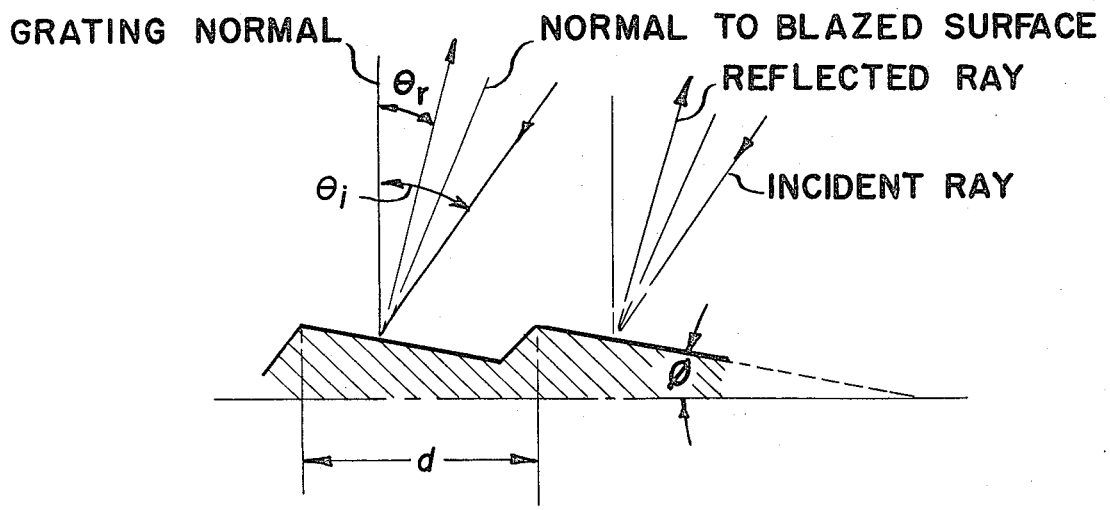
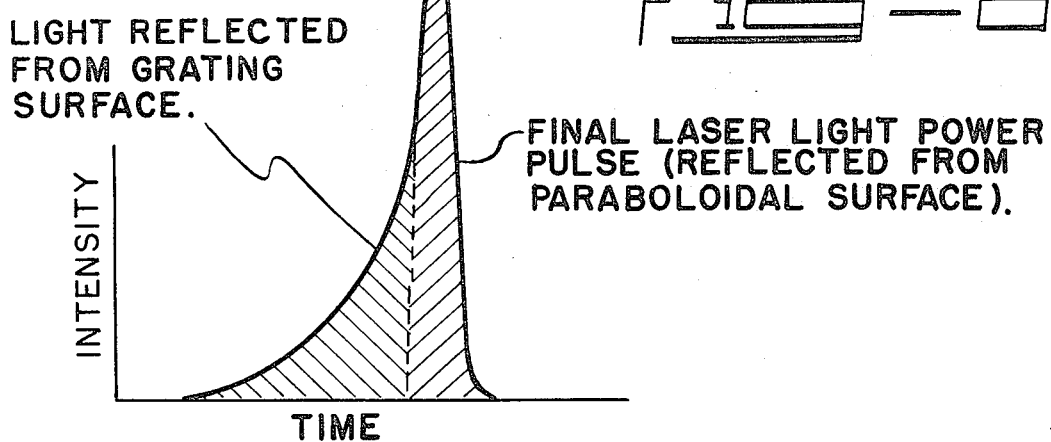

3,826,561

LASER PULSE TAILORING METHOD AND MEANS

BACKGROUND OF THE INVENTION

The invention described herein was made in the course of, or under, Contract No. W-7405-ENG-48 with the United States Atomic Energy Commission.

With the advent of the laser, much effort has been directed to various methods and apparatus for directing the maximum energy from the laser to a desired point of use in the appropriate time sequence, and is referred to as pulse tailoring. Generally, these prior efforts of laser pulse tailoring have been designed for the input to a laser amplifier because power losses are less important at the input. However, the laser amplification process is very likely to distort the pulse shape in a manner which may not be predictable and which may render it totally unusable.

SUMMARY OF THE INVENTION

The present invention involves a method and means for shaping or tailoring a laser pulse in space and time such that the energy arrives at the point of use in the desired time sequence whereby it is more effectively utilized.

This method allows one to accomplish the pulse tailoring at the output of the laser amplifier, thus making it far more predictable. It also utilizes a continuous tailoring technique which is unique since all previously proposed pulse tailoring techniques have been ones involving a series of discrete steps.

The time-tailoring method is carried out in either a stepwise or continuous manner and basically involves dividing up the laer beam into portions and reassembling the portions of the beam.

Therefore, it is an object of this invention to provide a method and means for tailoring a laser pulse.

A further object of the invention is to provide shaping of a laser pulse in space and time either in a stepwise manner or a continuous manner.

Another object of the invention is to provide a method and means for time-tailoring laser radiation by dividing the pulse and redirecting the portions thereof to allow arrival at a selected time and direction.

Another object of the invention is to provide a method and means for producing the formation of a specified time-tailored laser pulse by reflection of a short-pulse laser beam from a combination-type reflecting surface.

Other objects of the invention will become readily apparent from the following description and accompanying drawings.

BRIEF DESCRIPTION OF THE DRAWINGS

FIG. 4 is a schematic view of an apparatus for producing time-tailored laser pulse with a continuous characteristic;

FIG. 5 is an enlarged illustration of a portion of the FIG. 4 apparatus showing details or the reflections; and FIG. 6 graphically illustrates a shaped laser pulse produced by the FIG. 4 apparatus.

DESCRIPTION OF THE INVENTION

The invention is directed to a method and means for time-tailoring a laser pulse which is based on the principle of dividing up and reassembling portions of the laser beam. This basic principle may be carried out in a stepwise or a continuous manner, and inasmuch as different apparatus is required for each of these techniques of pulse shaping, the stepwise shaping will be described first with respect to FIGS. 1-3 after which the continuous shaping will be described with respect to FIGS. 4-6.

Figure 1:
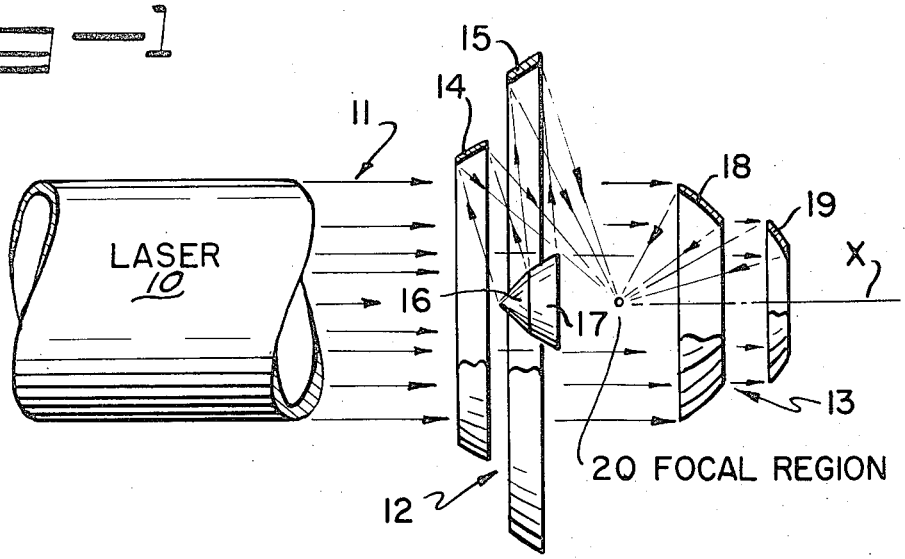
FIG. 1 is a view partially in cross-section of an embodiment of an apparatus for producing stepwise laser pulse tailoring wherein the pulse is divided and recombined.
Figure 2:
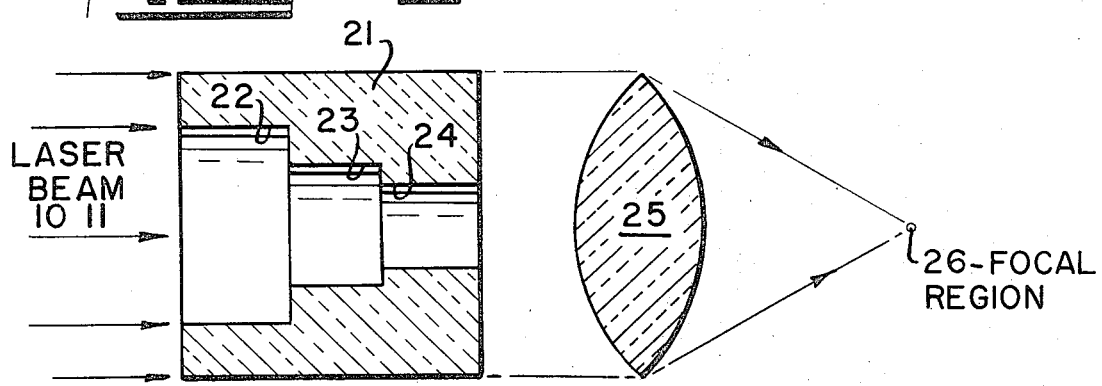
FIGS. 2 and 3 illustrate apparatus for carrying out the stepwise pulse tailoring method utilizing time delay and intensity relations.
Figure 3:
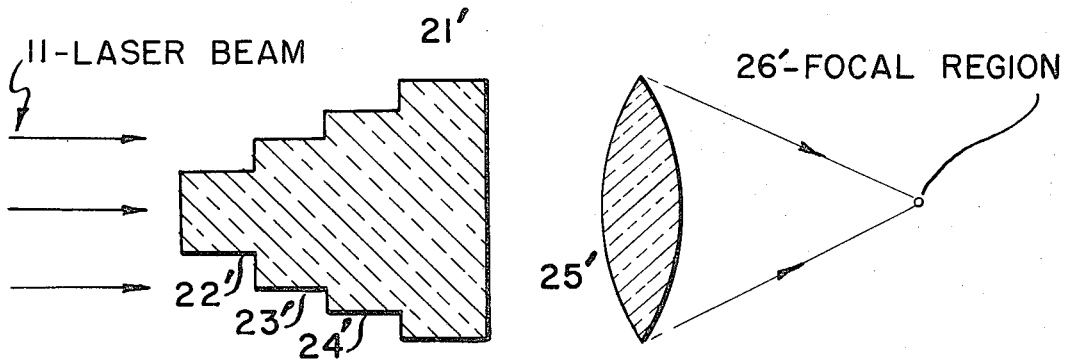

The method and means or apparatus illustrated in FIGS. 1-3 involve time-tailoring laser radiation wherein the intensity vs. time relations of the laser pulse are reshaped by dividing the beam or pulse, selectively delaying each portion, and reassembling or redirecting the portions of the pulse so as to allow arrival thereof in the focal region of interest at a selected time and direction, thus permitting stepwise shaping in space and time of the laser irradiation in the given focal region.

The stepwise shaping based on the above referenced principle may be carried out, for example, by the FIG. 1 apparatus which comprises a laser 10 directing a pulse or beam of radiation 11 through a left hand side (lhs) reflector assembly generally indicted at 12 and a right hand side (rhs) reflector assembly generally indicated at 13, reflector assemblies 12 and 13 being located along an axis X forming the center line of the laser beam 11. Reflector assembly 12 comprises a pair of spaced coaxial paraboloidal reflector sections or members 14 and 15 of different diameters and a pair of coaxial conical reflector members or sections 16 and 17 of different diameter. Reflector assembly 13 comprises a pair of spaced coaxial, different diameter, paraboloidal reflector members or sections 18 and 19. Note that reflector sections 14, 15, 18 and 19 and reflectors 16 and 17 are of different diameters. The reflector assemblies 12 and 13 are positioned in spaced relation along axis X so as to define a focal region 20 therebetween. Radiation or beam 11 from the pulsed laser 10 is divided, as indicated by the arrows, so that part of the beam is incidental from the right hand side of focal point 20 using the focussing reflector sections 18 and 19 of reflector assembly 13, and part from the left hand side of focal point 20 using the conical reflectors 16 and 17 and the focussing reflector sections 14 and 15. From each direction (lhs or rhs), the time-tailoring is adjustable by designing the individual focussing reflector sections 14-19 with different spatial separations (and correspondingly different focal lengths). The relative intensity of each portion of the resultant pulse can be adjusted by choosing the relative area of each reflector section (the laser itself having a radial intensity profile which must be considered and for which allowance must be made).

A simpler application of the pulse shaping method carried out by the FIG. 1 apparatus is the use of only the right hand side reflectors (assembly 13). Also the number and disposition of the reflectors in assemblies 12 and 13 is variable, whereby a single laser pulse can thus be divided in time and intensity into as many parts as there are reflector sections. Replication of the reflector arrangement shown in FIG. 1 in the Y-axis and in the Z-axis will provide six-fold symmetry. Also, the conical reflectors of FIG. 1 can be replaced by other reflecting surfaces with corresponding modification to the reflecting sections of assembly 12.

When the duration of the time-tailoring is sufficiently short ($<<10^{-9}$ sec.), an alternate method can be utilized by apparatus illustrated in FIGS. 2 and 3 which involves passing the laser beam 11 through a transparent material 21 or 21' having an index of refraction greater than the surroundings constructed, for example of quartz or germanium. The material 21 in FIG. 2 is provided with varying cross-section internal countersunk sections 22, 23 and 24, while material 21' of FIG. 3 is provided with varying cross-section external sections or steps 22', 23' and 24', a lens 25 or 25' being positioned in spaced relation with respect to material 21 and 21' for redirecting the portions of beam 11 onto a focal region 26 and 26', respectively. Here the time delay and intensity relations are adjusted by interposing the transparent media 21 or 21' and accompanying lens 25 and 25' to generate different optical path lengths in different portions of the laser beam 11. (The optical path length is defined as $\int nds$ where $n=$ index of refraction and $s$ is the distance.) This process results in stepwise shaping of the pulse. In general, of course, it is desirable that the laser rays intersect parallel surfaces in the pulse shaping media 21 or 21' in order to prevent complications in the pulse tailoring process. While fabrication of the transparent material 21 of FIG. 2 would involve forming of the countersunk sections 22–24, the FIG. 3 embodiment 21' is particularly simple to implement and can be fabricated, for example, using flat disks with anti-reflection coatings. It is readily apparent that the number of countersunk sections in FIG. 2 or the steps in FIG. 3 can be varied to provide tailoring of the pulse 11 in any desired form.

The particular advantages of the stepwise shaping technique described above and illustrated in FIGS. 1–3 are: (1) the laser pulse tailoring can be carried out at the output of a laser amplifier (or at the input thereto); (2) the laser beam is utilized completely over its cross section; and (3) it requires only the generation of a laser pulse which is sufficiently short to allow for the fastest rising part of the desired shaped pulse.

The method and means illustrated in FIGS. 4–6 involve the combination of a blazed (echelette) diffraction grating reflector and a paraboloidal reflector used to time-tailor a short-pulse laser beam, providing a continuous (as opposed to a stepwise) pulse shape characteristic. Thus, by reflection of a short-pulse laser beam from a combination-type reflecting surface, the formation of a specified time-tailored high-power laser pulse can be achieved. As illustrated in FIG. 4, a beam 30 from a laser 31 is reflected from a reflector assembly 32 onto a focal region 33, reflector assembly 32 being composed of a blazed (echelette) diffraction grating (non-paraboloidal) reflector or mirror section 34 and a paraboloidal reflector or mirror section 35, with reflector assembly 32 being symmetrically positioned about an axis X corresponding to the center line (CL) of the laser beam 30. This technique is similar to that described above with respect to FIGS. 1–3, but produces a time-tailored laser pulse with a quasi-continuous characteristic as discussed in detail hereinafter, as opposed to the stepwise technique.

To understand the limitation which arises with the stepwise shaping technique described above, assume that it is necessary to irradiate a designated focal region with a specified time-intensity relation, using the energy portions of a given laser beam. Then, in principle, a reflecting surface (or a series of reflecting surfaces) can be designed which will delay each energy portion by the appropriate number of integral wavelengths to deliver the required time-intensity irradiation. Thus far, this concept is identical with that described with respect to FIGS. 1–3 and is also based on the principle of dividing up and reassembling portions of the laser beam. If, however, the size of an individual reflecting surface must be very small (to obtain the requisite continuity in pulse-shape characteristic), it becomes necessary to consider diffraction phenomena. For example, assume a time step of $10^{-2}$ sec, then the reflector dimension $d$ is $\approx 300$ $\mu$m. Assuming a focal length $f \gtrsim 10$ cm, and wavelength $\lambda \approx 10$ $\mu$m, then diffraction effects would cause the focal region to be larger than 3 mm, i.e., $$\Delta x \gtrsim f\lambda/d$$

This is already too large for laser fusion on thermonuclear fuel droplets.

The technique carried out by the FIG. 4 apparatus is based on diffraction effects and implies that the size of the focal region can be maintained sufficiently small, although detailed calculations will be necessary to determine this.

The continuous pulse shaping technique carried out by the FIG. 4 embodiment, for example, produces a shaped laser pulse of the type shown in FIG. 6. Since the reflector assembly of FIG. 4 is symmetrical about the $x$-axis, replication in several directions is possible and in the FIG. 1 embodiment. The shaped (tailored) laser pulse of FIG. 6 results from the summation of portions of the incident laser beam reflected from the grating reflector elements, as seen in greater detail in FIG. 5, and from the paraboloidal reflector. The resultant intensity is a function of reflector surface areas and of the incident laser beam energy distrbution. The grating geometric relations (ray optics), shown in FIG. 5, are given by the grating equation:

$$\text{SIN } \theta_r + \text{SIN } \theta_i = m \, \lambda/d$$

where: $\theta_r =$ angle of reflection, $\theta_i =$ angle of incidence, $m =$ order of reflection maximum of grating, $\lambda =$ laser wavelength (constant), and $d =$ grating spacing.

The order in which the grating 34 concentrates the reflected light from paraboloidal reflector 35 depends on the echelette relations:

$$\theta_r - \theta_i = 2\phi$$

where $\phi$ is the angle of the echelette (see FIG. 5). Since $\theta_i$ and $\theta_r$ are continuously variable functions along the grating, it will be necessary to vary both $d$ and $\phi$ continuously to satisfy the above two equations.

It is thus seen that the continuous technique carried out by the FIG. 4 apparatus has certain advantages over the stepwise shaping technique of FIGS. 1–3. However, the actual limitations in continuity of the pulse shaping will depend on the system details, and for determining these limitations the stepwise and continuous shaping can be considered as complementary. It should be noted in continuous shaping, because of the aperiodicity in $d$ and the nonconstancy of $\phi$, the standard diffraction grating relations are not applicable. Also, the grating reflector of FIG. 4 (unlike the achromatic reflectors) shows explicit dependence on the wavelength(s) of the laser.

Thus, the present invention provides a method and apparatus or means for time-tailoring the intensity of focussed laser radiation in the focal or target region, this being by either stepwise or continuous shaping via sectioned reflectors, transport delay media and lenses, and combined grating and paraboloical reflectors. The choice will depend on the pulse shape requirements and on the wavelength(s) present in the laser beam(s). This enables one to establish a selected profile to satisfy time intensity of the laser.

While particular embodiments of the invention have been illustrated and described, modifications will become apparent to those skilled in the art, and it is intended to cover in the appended claims all such modifications as come within the spirit and scope of the invention.

What I claim is:

1. A method for time-tailoring focused laser radiation energy in a focal region comprising the steps of: dividing a beam of radiation energy into a plurality of portions by directing the beam onto a plurality of reflectors comprising a plurality of centrally positioned conical reflectors, and redirecting the thus divided portions to arrive at a specified region at a selected time by positioning a reflective assembly comprising a plurality of radially located different diameter reflecting members with respect to at least a portion of the plurality of conical reflectors for reflecting at least a part of the thus divided portions of the beam onto the specified focal region.

2. An apparatus for time-tailoring a laser beam comprising: means for dividing a laser beam into a plurality of portions, and means for reassembling the portions of the beam at a specified region at a selected time, said dividing means comprising a plurality of reflector assemblies, said assemblies being positioned in spaced relation whereby the specified region is defined as a common focal region of at least certain portions of said assemblies, one of said reflector assemblies comprising a plurality of centrally positioned conical reflectors which reflect portions of said beam onto a plurality of radially located reflector members constructed to redirect the reflected portions onto said common focal region, another of said reflector assemblies comprising a plurality of reflector members of different cross-section constructed to reflect portions of said beam onto said common focal region, said last-mentioned reflector members and said radially located reflector members of said one reflector assembly additionally defining said reassembling means.

* * * * *